Aug 18 1925.

E. E. BRASS 1,550,423

CUTTING AND SEPARATING DEVICE

Filed March 28, 1925

INVENTOR.
EDWARD E. BRASS.
BY
ATTORNEYS.

Patented Aug. 18, 1925.

1,550,423

UNITED STATES PATENT OFFICE.

EDWARD E. BRASS, OF PETERSBURG, ILLINOIS, ASSIGNOR TO INDIANA CANNING MACHINERY COMPANY, OF INDIANAPOLIS, INDIANA, A CORPORATION.

CUTTING AND SEPARATING DEVICE.

Application filed March 28, 1925. Serial No. 19,037.

*To all whom it may concern:*

Be it known that I, EDWARD E. BRASS, a citizen of the United States, and a resident of Petersburg, county of Menard, and State of Illinois, have invented a certain new and useful Cutting and Separating Device; and I do hereby declare that the following is a full, clear, and exact description thereof, reference being had to the accompanying drawings, in which like numerals refer to like parts.

This invention pertains to a pumpkin cutter and separator for cutting up pumpkins into relatively small pieces and separating the seeds therefrom.

The object of the invention is to provide a machine of this character into which pumpkins after having been cleansed are fed, and which, through the power driven operation thereof, will cut the pumpkins into small pieces, permit the seeds to be discharged and separated therefrom, rinsing the pieces of pumpkin and thereafter discharging them into a suitable conveyor.

The full nature of the invention will be understood from the accompanying drawings and the following description and claims.

Figure 1:
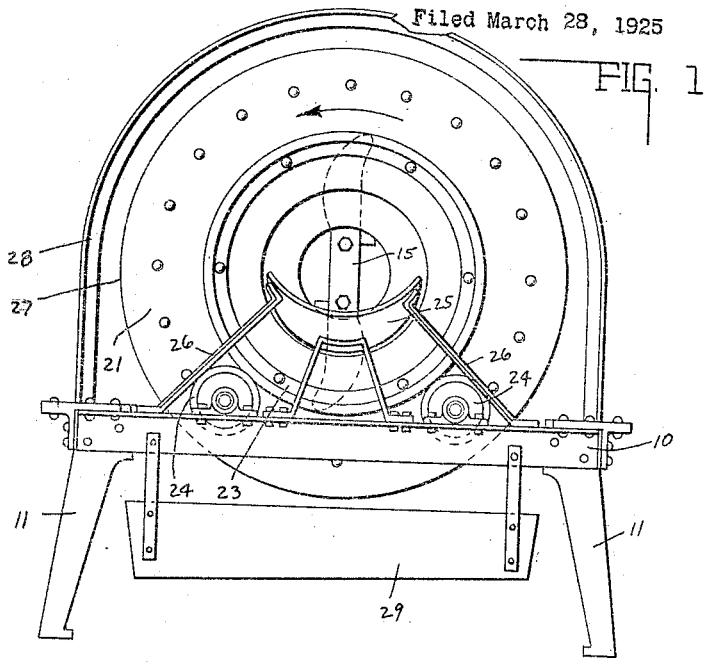
Figure 2:
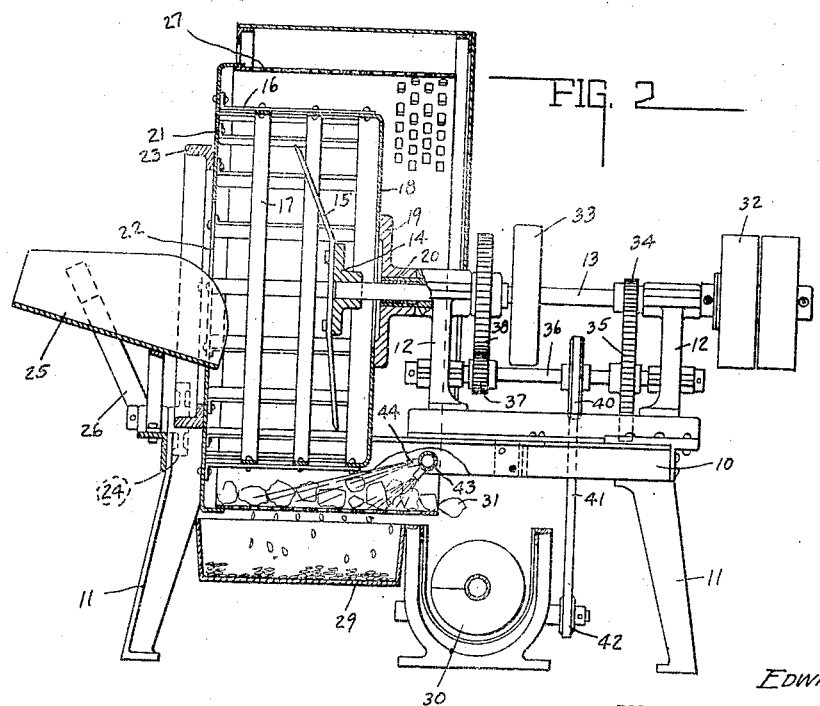

In the drawings, Figure 1 is a front elevation of the machine. Fig. 2 is a central vertical section taken therethrough, showing the power driving mechanism in elevation.

In the drawings there is shown a machine embodying a table 10 supported by the legs 11. Mounted on the table frame there are brackets 12 for rotatably supporting a driving shaft 13. Keyed to said shaft on one end thereof there is a spider 14 upon which the cutting blades 15 are rigidly secured, said cutting blades extending diametrically across the face of the spider, having one cutting edge bent slightly to the rear and the other cutting edge bent forwardly at an angle, as shown in Figs. 1 and 2. Surrounding the cutting knife there is a cylindrical cage 16 having its periphery formed of the crisscross straps 17 so as to leave a rectangular opening therebetween. The rear surface of the cage is provided with a back plate 18 and is supported upon a mounting 19 keyed to a hollow driving shaft 20 which surrounds the shaft 13 and is rotatable with respect thereto. The forward end of the cage is provided with a closing plate 21 having an annular opening 22 about the center thereof. Said forward end of the cage is supported by an angle iron ring 23 to which it is rigidly secured, said ring riding upon the rollers 24.

Mounted on the forward end of the frame there is a discharge chute 25 supported in position by the brackets 26 for discharging pumpkins into the cage through the opening 22.

Surrounding said cage and spaced from the periphery thereof there is a perforated or screened drum 27, the periphery thereof being spaced from the periphery of the cage sufficiently to permit the free movement of the particles of pumpkin therebetween. The forward portion of the frame is a continuation of the front plate 21 and the rear portion thereof is entirely open. Therefore, said drum is supported by the rollers 24 and forms a rigid part of the cage. Surrounding the upper portion of the drum and spaced from the upper periphery thereof there is a casing or housing 28. Suspended from the frame 10 immediately below the drum 27 there is an under pan 29, and adjacent thereto extending under the table 10 there is a conveyor 30 in position to receive the particles of pumpkin 31 which may tumble out of the open face of the drum.

The shaft 13 is driven from any suitable source of power through the medium of a fixed pulley 32, and as said shaft is directly connected with the cutting blades 15, said blades will be rotated at the same speed as the driving pulley. Said shaft is provided with a fly wheel 33 and a pinion 34. Said pinion is adapted to mesh with a gear 35 keyed to a shaft 36 upon which is keyed a pinion 37 adapted to mesh with a gear 38. Said gear 38 rides freely on the shaft 13 and is directly connected with the hollow shaft 20, whereby the cage and drum will be rotated therethrough at a reduced speed from the cutting knives. Keyed to the shaft 36 there is a sprocket wheel 40 adapted to drive a sprocket chain 41 which drives a sprocket 42 which in turn through suitable gearing drives the screw conveyor 30.

Mounted upon the frame there are provided suitable water pipes 43 having nozzles 44 for directing a spray into the drum for rinsing cut particles of pumpkin and washing the seeds therefrom.

In operation the pumpkins are washed and discharged through the chute 25 into the cage. They are caused to rotate thereby and are cut into small pieces through the action of the rotating cutting blades 15. They are retained in the cage until they are cut in small enough pieces to pass through the rectangular spaces formed by the relative positions of the straps 17, after which they pass into the space between the cage and the drum 27. The rotation of the drum with the cage causes the seeds to be released and discharged through the perforations in the screen so as to fall into the under pan 29. At the same time the seeds and pieces of pumpkins are sprayed and rinsed with the water from the pipe 43. As the drum becomes filled with particles of pumpkin they will force each other therefrom into the conveyor 30 and be carried away thereby from the machine.

The invention claimed is:

1. A cutter and separator comprising a cage for receiving pumpkins or the like, said cage being provided with relatively large openings therein, a rotary cutting knife rotatably mounted in said cage, and means for rotating said knife, whereby the pumpkins or the like contained therein will be cut and caused to pass through the openings in said cage.

2. A cutter and separator comprising a rotatable cage for receiving pumpkins or the like, said cage being provided with relative large openings therein, a rotary cutting knife rotatably mounted in said cage, and means for rotating said knife and cage, whereby the pumpkins or the like contained therein will be cut and caused to pass through the openings in said cage.

3. A cutter and separator comprising a rotary cage for receiving pumpkins or the like, said cage being provided with relatively large openings therein, a rotary cutting knife rotatably mounted in said cage, and means for rotating said knife and cage at different speeds with respect to each other.

4. A cutter and separator comprising a cage member for receiving pumpkins or the like, said cage member being provided with relatively large openings therein, a cutting knife member mounted in said cage, and means for rotating one of said members with respect to each other.

5. A cutter and separator comprising a rotatable cage for receiving pumpkins or the like, said cage being provided with a front plate having a relatively large annular opening through which the pumpkin or the like may pass, a rear plate closing the opposite side thereof, a plurality of straps connecting said plates, a plurality of peripheral straps connected thereto, said straps forming the periphery of said cage and being spaced apart so as to provide relatively large openings therethrough, a cutting blade mounted in said cage, and means for rotating said blade therein.

6. A cutter and separator comprising a rotatable cage for receiving pumpkins or the like, said cage being provided with relatively large openings therein, a front plate having a central opening through which the pumpkins or the like may pass, a rear plate for closing the rear thereof and providing a bearing, a shaft extending therethrough upon which said cage is rotatably mounted, a ring secured to the front plate about the opening therein, a roller upon which said ring is adapted to ride, whereby said cage will be rotatably supported at the front thereof, a cutting knife rotatably mounted in said cage, and means for rotating said knife and cage at different speeds.

7. A cutter and separator comprising a cage for receiving pumpkins or the like, said cage being provided with relatively large openings therein, a perforated drum mounted about said cage so as to surround the same and be spaced therefrom, a rotating cutting knife mounted in said cage, and means for rotating said knife therein.

8. A cutter and separator comprising a cage for receiving pumpkins or the like, said cage being provided with relatively large openings therein, a perforated drum mounted about said cage so as to surround the same and be spaced therefrom, a rotating cutting knife in said cage, and means for rotating said cage and drum as a unit and said cutting knife independently thereof at different speeds.

9. A cutter and separator comprising a cage for receiving pumpkins or the like, said cage being provided with relatively large openings therein, a perforated drum mounted about said cage so as to surround the same and be spaced therefrom, a rotating cutting knife in said cage, means for rotating said cage and drum as a unit and said cutting knife independently thereof at different speeds, and means associated with said drum for discharging a rinsing spray therein.

10. A cutter and separator comprising a cage for receiving pumpkins or the like, said cage being provided with relatively large openings therein, a perforated drum mounted about said cage so as to surround the same and be spaced therefrom, a rotating cutting knife in said cage, means for rotating said cage and drum as a unit and said cutting knife independently thereof at different speeds, an under pan mounted below said drum for receiving the contents thereof which may pass through its perforations, and a conveyor associated therewith in position to receive the contents thereof which are small enough to pass through the openings in said cage, but not through the perforations.

In witness whereof, I have hereunto affixed my signature.

EDWARD E. BRASS.